United States Patent
Nogues et al.

(10) Patent No.: US 8,808,488 B2
(45) Date of Patent: Aug. 19, 2014

(54) METHOD FOR THE CONTINUOUS PRODUCTION OF A CONNECTING PART MADE FROM COMPOSITE MATERIAL

(75) Inventors: Dominique Nogues, Hourtin (FR); Frederic Louart, Cestas (FR); Jean-Pierre Maumus, Saint Medard En Jalles (FR)

(73) Assignee: Epsilon Composite, Gaillan en Medoc (FR)

( * ) Notice: Subject to any disclaimer, the term of this patent is extended or adjusted under 35 U.S.C. 154(b) by 0 days.

(21) Appl. No.: 13/637,060

(22) PCT Filed: Mar. 24, 2011

(86) PCT No.: PCT/FR2011/050626
§ 371 (c)(1), (2), (4) Date: Sep. 25, 2012

(87) PCT Pub. No.: WO2011/117546
PCT Pub. Date: Sep. 29, 2011

(65) Prior Publication Data
US 2013/0020019 A1 Jan. 24, 2013

(30) Foreign Application Priority Data

Mar. 25, 2010 (FR) ...................................... 10 52141
Mar. 25, 2010 (FR) ...................................... 10 52142

(51) Int. Cl.
*B29C 70/52* (2006.01)
*B29C 70/54* (2006.01)
*F16C 7/02* (2006.01)
*B29L 31/06* (2006.01)

(52) U.S. Cl.
CPC .................. *B29C 70/52* (2013.01); *Y02T 50/43* (2013.01); *B29C 70/545* (2013.01); *F16C 2326/43* (2013.01); *F16C 7/026* (2013.01); *Y02T 50/433* (2013.01); *B29L 2031/06* (2013.01)
USPC ... 156/244.13; 156/294; 264/150; 264/209.1; 74/579 R; 464/181; 464/182; 464/183

(58) Field of Classification Search
USPC .................. 156/244.13, 294; 264/150, 209.1; 74/579 R; 464/181, 182, 183
See application file for complete search history.

(56) References Cited

U.S. PATENT DOCUMENTS 4,483,731 A 11/1984 Dohle et al.
(Continued)

FOREIGN PATENT DOCUMENTS

| DE | 10 2007 015909 | 10/2008 |
|---|---|---|
| EP | 0 626 250 | 11/1994 |
| EP | 0 628 402 | 12/1994 |

(Continued)

OTHER PUBLICATIONS

International Search Report dated Aug. 3, 2011, corresponding to PCT/FR2011/050626.

*Primary Examiner* — Jeff Aftergut
*Assistant Examiner* — Jaeyun Lee
(74) *Attorney, Agent, or Firm* — Young & Thompson (57) ABSTRACT

A method for producing a connecting part (30), such as a connecting rod for an aircraft, made from a composite material, the connecting part including at least one hollow body (32) and at least one yoke (34) at each of the ends (36) of the body (32), is characterized in that the body (32) and the yokes (34) of the connecting part (30) are produced from a single section (P, P1, P2) made from a composite material and obtained using a continuous production process.

21 Claims, 5 Drawing Sheets

(56) References Cited

U.S. PATENT DOCUMENTS

| | | |
|---|---|---|
| 5,571,357 A | 11/1996 | Darrieux et al. |
| 6,202,505 B1 | 3/2001 | Auberon et al. |
| 2005/0056117 A1* | 3/2005 | Jones .................. 74/579 R |
| 2010/0196637 A1 | 8/2010 | Lippert et al. |
| 2010/0278586 A1 | 11/2010 | Cavaliere et al. |

FOREIGN PATENT DOCUMENTS

| | | |
|---|---|---|
| EP | 1 213 526 | 6/2002 |
| FR | 2 918 134 | 1/2009 |
| GB | 2 096 530 | 10/1982 |
| WO | 2009/138660 | 11/2009 |
| WO | 2010/000990 | 1/2010 |

* cited by examiner

METHOD FOR THE CONTINUOUS PRODUCTION OF A CONNECTING PART MADE FROM COMPOSITE MATERIAL

This invention relates to a connecting part made of composite material, as well as to the method for producing said connecting part of composite material.

Figure 1:
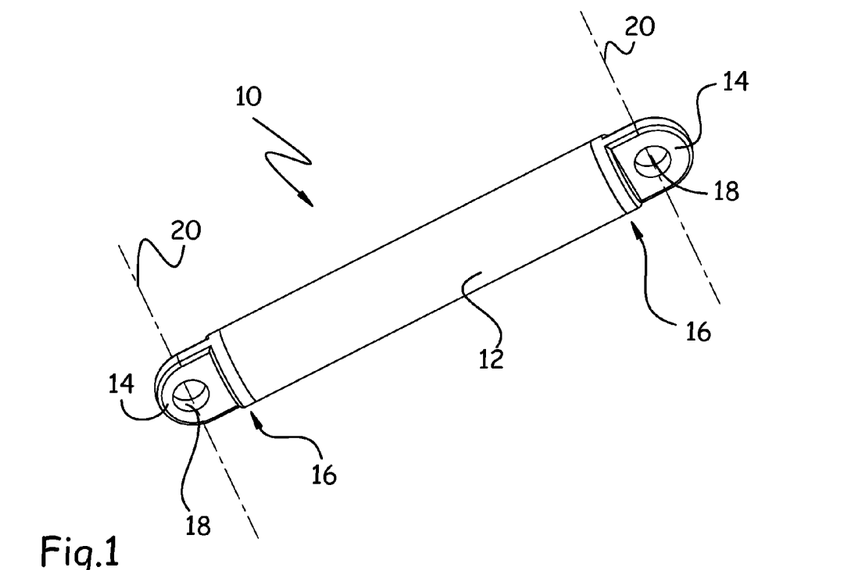
FIG. 1 shows a perspective view of a connecting part according to the prior art.

FIG. 1 illustrates a connecting part 10 according to the prior art, also known as a connecting rod, and used to connect two elements.

In a known way, a connecting rod 10 comprises an elongated body 12 and at least one yoke 14 at each of the ends 16 of said body.

Said yokes 14 each comprise a bore 18 made along an axis 20 that is approximately at right angles to the longitudinal axis of the body 12 of the connecting rod, these bores being used for the passage of means for fastening to the elements to be connected.

In certain applications, the connecting rods are used for producing highly stressed structures.

One of these applications, particularly intended by this invention, relates to the production of a part of the structure of an aircraft located in the different sections of an aircraft, and that in particular are part of the framework located under the floor of said aircraft.

In greater detail, such a part of the structure of an aircraft takes the shape of boxes.

Thus, a multitude of connecting rods of different lengths are assembled in lattice form to ensure the mechanical performance and rigidity of said boxes, or more directly in support at right angles with the floor.

Of course, during the flight phases of the aircraft, the connecting rods of the lattice participate in the absorption of the aerodynamic stresses sustained by the wings of the aircraft and more generally by the entire structure of the aircraft.

Also, it is known that the structure of an aircraft must be as light as possible for reasons of fuel economy and of increasing the flight range of the aircraft.

The connecting rods must therefore offer mechanical characteristics that make it possible for them to absorb significant buckling and tension/compression stresses, with particularly high safety coefficients at the level of the wings, all while remaining as light as possible.

In addition to the weight/mechanical characteristics trade-off, the manufacturers of connecting rods must preserve an optimal production efficiency.

Also, it is known that the use of composite material generally makes it possible to comply with the constraints imposed on the manufacturers for the production of said connecting rods, the composite materials making possible the production of connecting rods with hollow bodies, therefore of reduced weight, with mechanical characteristics that are equivalent or superior to those of the connecting rods made of metallic material.

These constraints are checked during several rating tests specified by the manufacturer of the aircraft and performed under different conditions, for example at different temperatures, or after chemical, particularly wet, aging cycles, or else after mechanical fatigue cycles.

In the case of connecting rods used in the boxes of an aircraft, the lattice forms a hyperstatic assembly and the rating force is determined by the stiffness of the connecting rod, which imposes a relatively narrow window for calculating the ideal dimensions: the connecting rods must have sufficient material to offer the required mechanical characteristics without, however, exceeding a certain cross-section and exhibiting too great a stiffness.

Moreover, the connecting rods of composite material are generally more susceptible to shocks than the connecting rods made of metallic material for the same stiffness.

Said connecting rods made of composite material, and more particularly their body, must nevertheless undergo perforation tests and make it possible to visualize a defect generated by an impact.

Finally, and still in comparison with the connecting rods of metallic material, another difficulty of calculating the ideal dimensions of the connecting rods made of composite material relates to the resistance of the yokes of said connecting rods to the battering pressures.

Different connecting rods of composite material and different methods for producing said connecting rods have been developed to respond to these particular constraints.

Thus, a first document of the prior art consisting of a European patent application published under the reference EP-1.213.526 discloses a method for producing a connecting rod consisting of assembling two metallic end pieces with a hollow body of composite material, the end pieces forming the yokes of said connecting rod.

The junction between the metallic end pieces and the body of composite material is performed by means of a glued threading, the metallic end pieces having threaded surfaces screwed into the tapped ends of the hollow body.

In terms of production efficiency, this first production method is not optimal because it necessitates several precise machining operations of two metallic parts, as well as meticulous steps of gluing and assembly by screwing.

In addition, this first method does not make it possible to produce a monolithic connecting rod, i.e., whose body and yokes are manufactured simultaneously.

A second method, described in the international application with publication number WO-2009/138660, foresees the production of a connecting rod comprising two inserts, preferably metallic, having bores at their ends, a core fitted between said inserts and obtained by molding of a composite comprising reinforcing fibers embedded in a thermosetting or thermoplastic matrix, as well as a strap surrounding the unit and made of a filament winding impregnated with a thermosetting or thermoplastic matrix, the assembly being made with a prestressing by compression of the core and by tension of the strap.

This second production method does not make it possible to obtain a connecting rod whose body and yokes are manufactured simultaneously from the same material.

Also, the different assembled components form a non-homogeneous part whose cohesion is liable to change according to a production from different materials.

In addition, the various manufacturing steps reduce the production efficiency of such a method.

A third method, described in the international application published under the reference WO-2010/000990, foresees the production of a connecting rod from preforms and that consists in placing the preforms around a support so that the coupling edges of said preforms overlap, in connecting said coupling edges by seam, and in extracting said support and inserting in its place a molding core before putting the assembly inside a mold and injecting resin under pressure into the mold followed by a polymerization of the resin.

Although being able to make it possible to obtain a connecting rod whose body and yokes are manufactured simultaneously from the same material, this third method comprises several manufacturing operations among which is the polymerization step that lengthens the production cycle time by several hours.

This invention aims to eliminate the drawbacks of the prior art and proposes a method for the production of a connecting part, such as a connecting rod, whose body and yokes are manufactured simultaneously from the same material, said method comprising a reduced number of operations reducing the cycle times and therefore the production costs of said connecting part.

This invention has as its object the production of a connecting part that exhibits good mechanical characteristics, a reduced weight, and a minimal manufacturing cost in comparison with the connecting rods of the prior art.

For this purpose, the invention has as its object a method for producing a connecting part, particularly a connecting rod of an aircraft, made of composite material, said connecting part comprising at least one hollow body and at least one yoke at each of the ends of said body, said body and said yokes of the connecting part being derived from a single profile of composite material obtained by a continuous manufacturing process.

Other characteristics and advantages will emerge from the following description of the invention, a description given by way of example only, with regard to the accompanying drawings in which.

This invention relates to the manufacturing of connecting parts that must exhibit a minimal weight and offer high mechanical characteristics.

The invention aims more particularly at manufacturing connecting parts used for the making of a lattice ensuring the rigidity of the boxes located in different sections of an aircraft.

Of course, this particular application is in no way limiting.

Certain composite materials make it possible to offer very high mechanical characteristics for a minimum amount of material, and therefore a minimum weight; the invention therefore proposes a method for producing a connecting part made of composite material.

Figure 2:
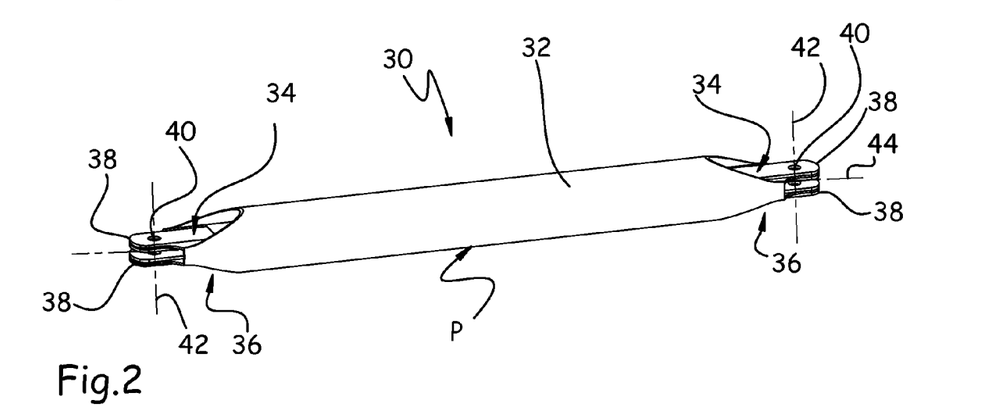
FIG. 2 shows a perspective view of a connecting part in a first preferred embodiment according to the invention.

Such a connecting part 30, in particular illustrated in FIG. 2, comprises at least one hollow body 32 and at least one yoke 34 at each of the ends 36 of said body.

Said yokes 34 each comprise at least one lug 38, preferably two, through which a bore 40 passes that is made along a transverse axis 42 and that is approximately perpendicular in relation to the longitudinal axis 44 of said body 32.

Because of the mechanically advantageous properties of the composite material selected for the needs of the invention, and subsequently detailed in the description, the body 32 of the connecting part can be designed hollow.

Such a hollow body 32 makes it possible to prevent the connecting part 30 from being too heavy and from exhibiting too great a stiffness, particularly in view of the determination of rating stress or stresses for an aeronautical application.

According to this invention, the body 32 is defined as the portion of the connecting part 30 having as its main function the absorption of the stresses sustained by said part in the assembly where it is located.

In the case of a connecting part 30 participating in the assembly of the lattice of a box located in different sections of an aircraft, the role of said body consists mainly in absorbing the tension/compression stresses to prevent the buckling of said connecting part.

So as to greatly reduce the costs and production cycle times of a connecting part, in the production method according to the invention, said hollow body 32 and said yokes 34 of the connecting part 30 are derived from a single profile P of composite material.

Also, and still with the objective of improving the production efficiency, said profile P is obtained by a continuous manufacturing process.

By profile, the invention means a part with a constant cross-section continuously produced on a single production line, the different operations of the production line of the profile being performed one after the other without interruption.

Such a continuous manufacturing process makes it possible to reduce the production times and costs of said profile and therefore the manufacturing times and costs of the connecting part.

Preferably, in the production method according to the invention, the continuous manufacturing process of said profile P is pultrusion that consists in pulling fibers impregnated with a matrix through a heated die where the forming of the fibers and the polymerization or the fusion and the compacting of the matrix take place.

The fibers used are high-performance fibers, particularly carbon fibers, and the matrix used is of organic polymer, of thermosetting type, for example of epoxy, polyurethane, or vinyl ester, or of thermoplastic type.

Figure 3:
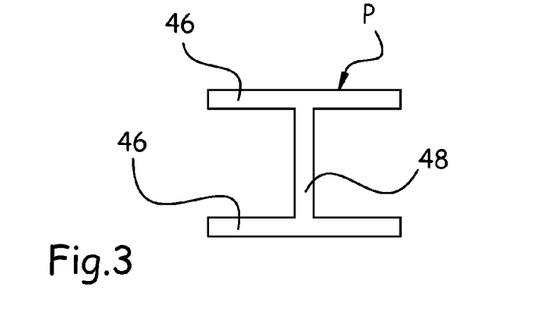
FIG. 3 shows a cross-section of a profile of a connecting part according to the invention.

Then, so as to impart to the connecting part 30 maximum mechanical characteristics for a minimum amount of material, the method according to the invention foresees the production of a profile P comprising at least two flanges 46 connected by at least one preferably solid web 48.

As illustrated by the cross-section of a profile in FIG. 3, the web 48 is the approximately vertical and approximately rectangular part of profile P, and the flanges 46 are the approximately horizontal, approximately rectangular and approximately parallel parts connected by said web.

Such a design of the profile P having at least one web 48 and at least two flanges 46 is able to impart to the profile the required minimum mechanical characteristics.

However, in a first preferred embodiment of a profile according to the invention illustrated in FIGS. 4 to 7, said profile P1 comprises at least two solid webs 48 connecting at least two flanges 46, which makes it possible to disengage the central part 50 of the profile and to improve its mechanical characteristics, particularly its resistance to buckling.

Figures 4, 5, 6:
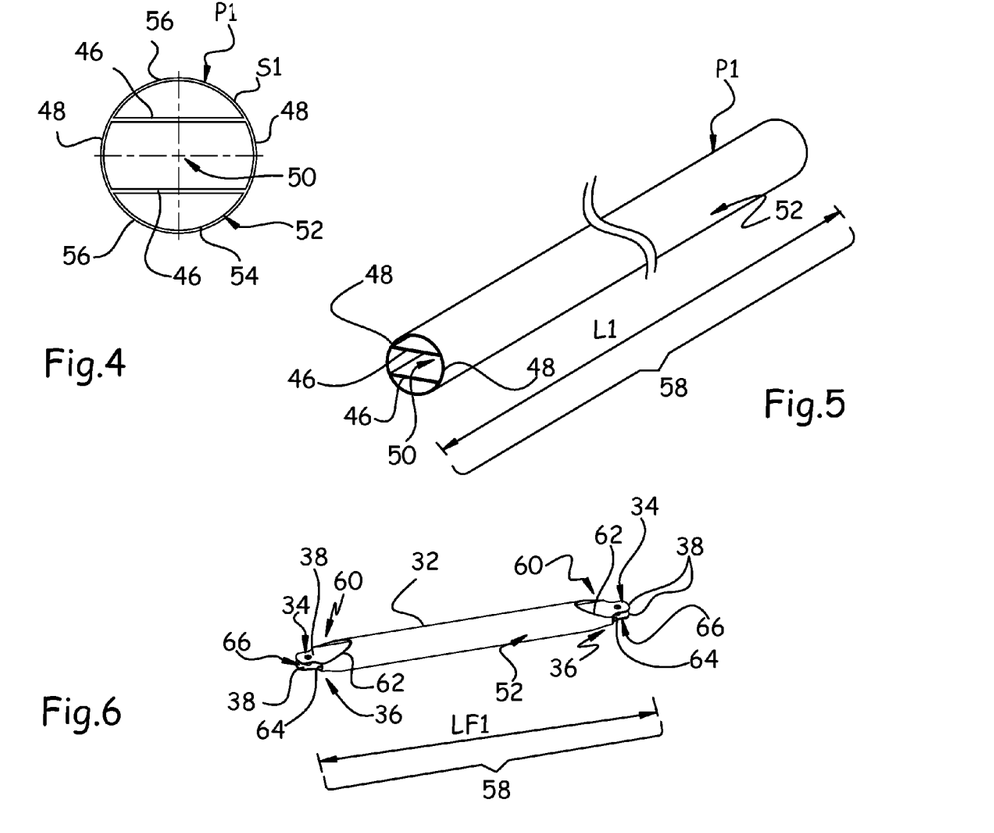
FIG. 4 shows a cross-section of a profile of a connecting part in a first preferred embodiment according to the invention.
FIG. 5 shows a portion of a profile of a connecting part in a first preferred embodiment according to the invention.
FIG. 6 shows the cuttings of the yokes in a portion of a profile of a connecting part in a first preferred embodiment according to the invention.

Still in this first embodiment, the profile P1 also comprises an outer shell 52 for protection against impacts and various shocks.

Said outer shell 52 assumes the shape of a membrane 54 that surrounds the flanges 46 of the profile P1 and essentially continues on the outer periphery of the cross-section S1 of the profile P1.

Preferably, said outer shell 52 is cylindrical over the length L1 of said profile P1.

Also, in this first preferred embodiment, at least two solid webs 48 connecting the flanges 46 are also an integral part of the protective outer shell 52.

Consequently, in this first preferred embodiment, the flanges 46 are approximately flat while the two webs 48 are approximately curved face to face and connected by two curved sections 56 that form the rest of the outer shell 52.

Figure 7:
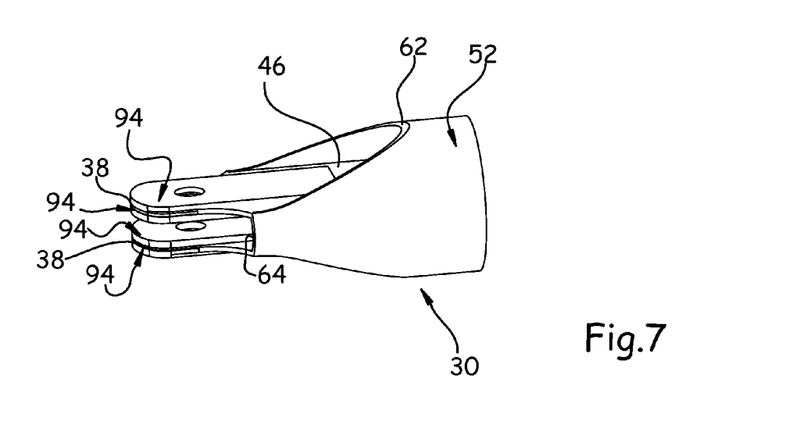
FIG. 7 shows reinforcements added at the level of the yokes of a profile of a connecting part in a first preferred embodiment according to the invention.

In this first preferred embodiment, following the continuous manufacture of said profile P1, and as illustrated in FIGS. 5 to 7, the production method according to the invention consists in at least:

selecting a portion 58 of predetermined length L1 from the profile P1 of composite material,
performing the cutting of the yokes 34 at each end 60 of said portion,
making the bores 40 through said cut yokes.

Advantageously, the making of the bores 40 in the yokes 34 can be performed at the moment of the mounting of the connecting part 30 in the assembly in which it participates.

In greater detail, the length L1 of selected profile P1 depends on the final length LF1 to be given to the connecting part 30, the selected length L1 being able to be greater than the final length LF1 to facilitate the subsequent cutting of the yokes of the connecting part.

Said cutting operations consist, on the one hand, in making tapered cuts 62 of the outer shell 52 at the ends 60 of the length L1 of selected profile P1 and on both sides of the flanges 46 of said profile P1, the tapered cuts 62 being approximately made in the curved sections 56 of the outer shell.

On the other hand, said cutting operations also consist in stopping the solid web or webs 48 of the profile P1 by straight cuts 64 at right angles with the tapered cuts 62 so as to disengage completely the ends 66 of the flanges 46 of the profile P1.

Finally, said cutting operations also consist in giving their final shape to the lugs 38 of the yokes 34 of the connecting part 30.

Said lugs 38 are cut in the ends 66 of the flanges 46 of the profile P1 approximately beyond the tapered cuts 62 of the outer shell 52 and straight cuts 64 of the webs 48, said lugs preferably assuming a rounded shape.

Therefore, it is found that this first embodiment is particularly advantageous because it makes it possible to obtain a connecting part 30, such as a connecting rod, whose body 32, yokes 34 and protective shell 52 are manufactured simultaneously from the same composite material.

Of course, the invention also covers different variants that can be imagined from this first preferred embodiment.

Figure 8A:
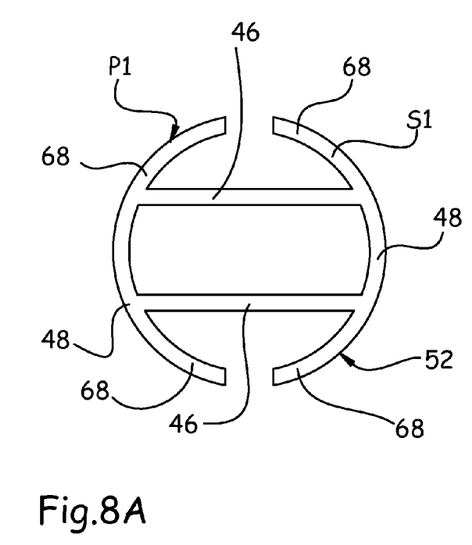
FIG. 8A shows a first variant of a cross-section of a profile of a connecting part in a first preferred embodiment according to the invention.

By way of example, FIG. 8A illustrates a first variant of a cross-section S1 of a profile P1 in which the outer shell 52 is not continuous and comprises only curved extensions 68 that extend the solid webs 48 on both sides of the flanges 46.

Figure 8B:
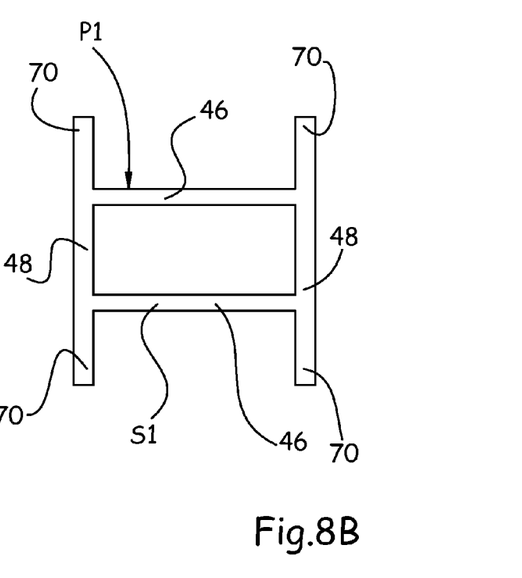
FIG. 8B shows a second variant of a cross-section of a profile of a connecting part in a first preferred embodiment according to the invention.

Also, and as illustrated in FIG. 8B, the invention also covers a second variant of a cross-section S1 of a profile P1 in which the outer shell 52 is not continuous and comprises only straight extensions 70 that extend the solid webs 48 on both sides of the flanges 46.

Figure 9:
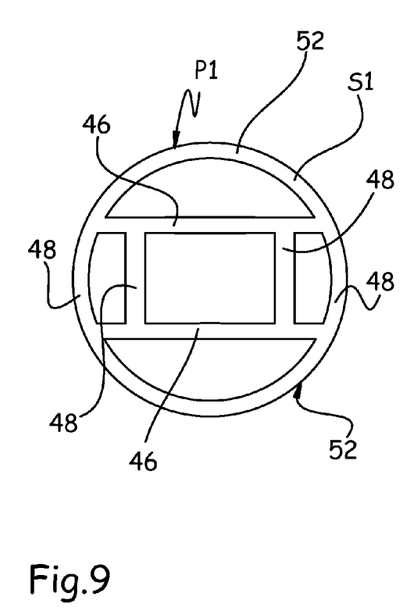
FIG. 9 shows a third variant of a cross-section of a profile of a connecting part in a first preferred embodiment according to the invention.

FIG. 9 illustrates a third variant of a cross-section S1 of a profile P1 that is covered by the invention in which the profile P1 comprises two central solid webs 48 in addition to two webs 48 that are part of the outer shell 52.

Figure 10:
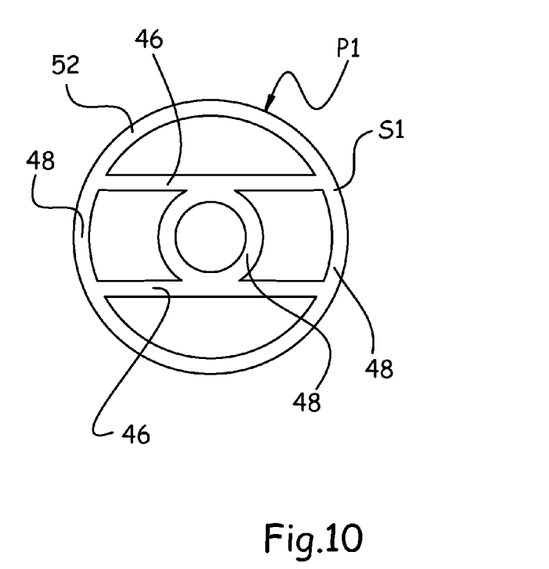
FIG. 10 shows a fourth variant of a cross-section of a profile of a connecting part in a first preferred embodiment according to the invention.

Finally, the invention also covers a fourth variant illustrated in FIG. 10 in which the profile P1 comprises a hollow and approximately cylindrical central web 48 in addition to two webs 48 that are part of the outer shell 52.

In a second preferred embodiment of a profile according to the invention, illustrated in FIGS. 11 to 14, the connecting part 30 is made from a first profile P2 comprising at least two solid webs 48 that connect the flanges 46, which makes it possible, as before, to disengage the central part 72 of the profile P2 and to improve its mechanical characteristics and particularly its resistance to buckling.

Figures 11, 12:
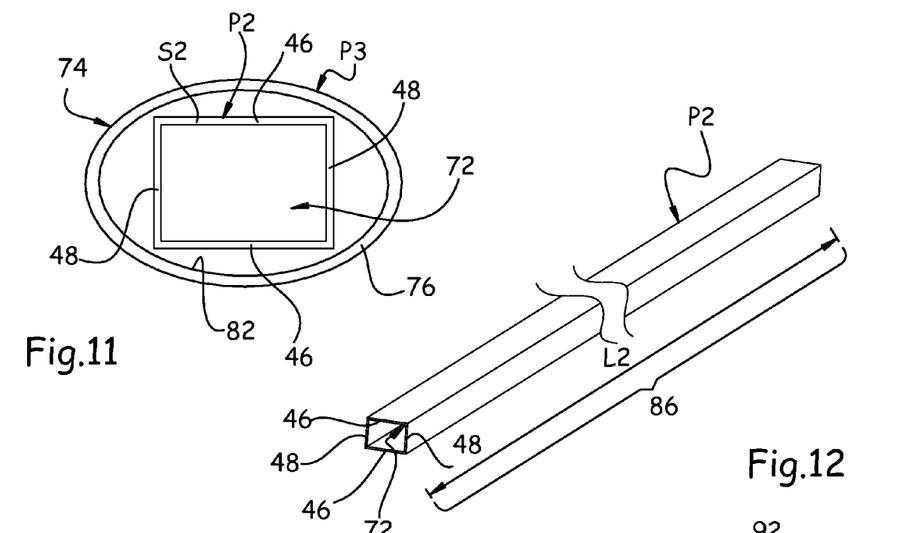
FIG. 11 shows a cross-section of the profiles of a connecting part in a second preferred embodiment according to the invention.
FIG. 12 shows a portion of a first profile of a connecting part in a second preferred embodiment according to the invention.

In this second preferred embodiment, the two flanges 46 are approximately flat and parallel, and the two webs 48 are also approximately flat and parallel.

Still in this preferred second embodiment, the first profile P1 can also receive an outer shell 74 for protection against the various impacts and shocks, said outer shell 74 assuming the shape of a second profile P3.

Said outer shell 74, or the second profile P3, assumes the shape of a membrane 76 surrounding the flanges 46 and the web or webs 48 of the first profile P2 and essentially continues on the outer periphery of the cross-section S2 of the first profile P2.

Preferably, said outer shell 74, or the second profile P3, is cylindrical over the length L2 of said first profile P2.

Also, in this second embodiment, said hollow body 32 and said yokes 34 of the connecting part 30, which participate mainly in the absorption of the stresses sustained by the connecting part, are derived from a single first profile P2 made of composite material, while the protective outer shell 74 is derived from a second profile P3.

Said first profile P2 is obtained by a continuous manufacturing process.

It is recalled that, by profile, the invention means a part with a constant cross-section produced continuously on a single production line, the different operations of the production line of the profile being performed one after the other without interruption.

Preferably, in the production method according to the invention, the continuous manufacturing process of said first profile P2 is pultrusion consisting in pulling fibers impregnated with a matrix through a heated die where the forming of the fibers and the polymerization or the fusion and the compacting of the matrix takes place, the fibers used being high-performance fibers, particularly carbon fibers, and the matrix used is of organic polymer, of thermosetting type, for example epoxide, polyurethane, or vinyl ester, or of thermoplastic type.

Said second profile P3 that forms the outer shell 74 can also be obtained by a continuous manufacturing process such as pultrusion.

However, in this second preferred embodiment, since the outer shell 74 does not participate in the absorption of stresses sustained by the connecting part 30, other manufacturing processes can be envisaged to obtain this second profile P3.

By way of example, said second profile P3 can be made from a composite material obtained by any other transformation means such as filament winding, autoclave molding, contact molding, injection molding under vacuum and/or low pressure, etc.

Or else, said second profile P3 can be made from materials other than a composite material, and for example from a metallic material, or plastic, etc.

Figure 14:
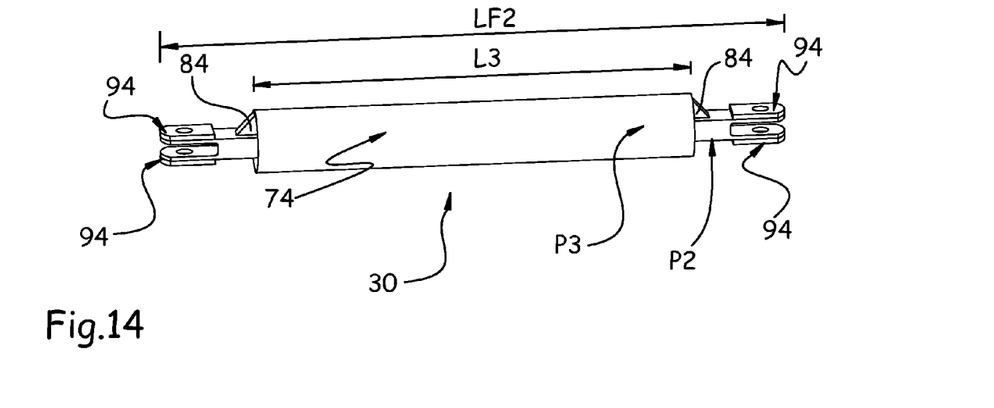
FIG. 14 shows the assembly of a first and second profile of a connecting part in a second preferred embodiment according to the invention.

Also, in this second preferred embodiment, attaching means 78 can be provided between said first profile P2 and said second profile P3.

These attaching means 78 are not inevitably necessary, and said profiles P2 and P3 can be adjusted dimensionally so as to be in contact while sliding in relation to one another.

However, these attaching means 78 can also assume various shapes known to an individual skilled in the art and can be carried by the first and/or second profile.

Thus, these attaching means 78 can consist in a dimensional adjustment of the profiles P2 and P3 so that they are in sliding contact, and then in a very localized gluing so as to bond them in position relative to one another.

These attaching means 78 can also consist in at least one collar 80 provided around the first profile P2 and of a shape corresponding to the inside contour 82 of the second profile P3, and/or in at least one stop 84 attached to said first profile P2 and that stops the second profile P3 in translation.

Other attaching means 78 can be provided, such as, for example, the injection of a foam between the two profiles P2 and P3.

Figure 13:
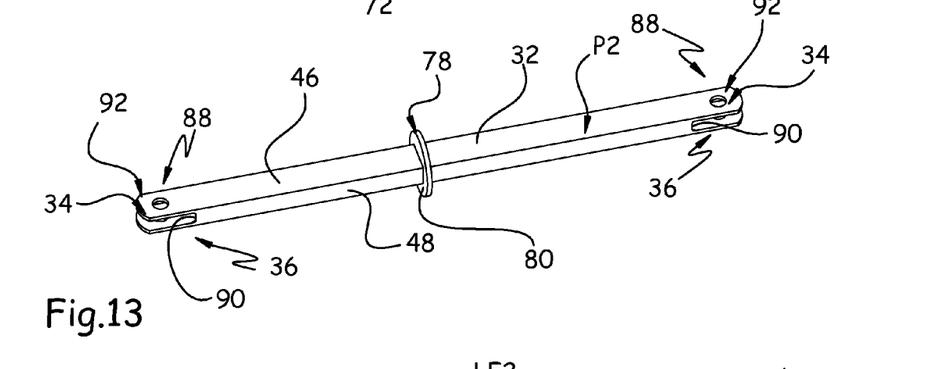
FIG. 13 shows the cuttings of the yokes in a portion of a first profile of a connecting part in a second preferred embodiment according to the invention.

In this second preferred embodiment, following the manufacture of the first and second profiles, and as illustrated in FIGS. 12 to 14, the production method according to the invention consists in at least:
  selecting a portion 86 of predetermined length L2 from the first profile P2 of composite material,
  performing the cutting of the yokes 34 at each end 88 of said portion,
  preparing the second profile P3 at an appropriate length L3,
  attaching said second profile P3 around the first profile P2, particularly by means of attaching means 78,
  making the bores 40 through said cut yokes.

Advantageously, the making of the bores 40 in the yokes 34 can be performed at the moment of the mounting of the connecting part in the assembly in which it participates.

In greater detail, the length L2 of the selected first profile P2 depends on the final length LF2 of the connecting part 30 thus produced, the selected length L2 being able to be greater than the final length LF2 to facilitate the subsequent cutting of the yokes of the connecting part.

Also, the length L3 of the second profile depends on the final length LF2 of the connecting part 30 thus produced, said length L3 being preferably adjusted to the final length LF2 so as to disengage the ends 88 and therefore the yokes 34 of the first profile P2.

On the one hand, the cutting operations of the first profile P2 consist in stopping the solid webs 48 of the first profile P2 by straight cuts 90 recessed from the ends 92 of the flanges 46 of said first profile.

On the other hand, said cutting operations also consist in giving their final shape to the lugs 38 of the yokes 34 of the connecting part.

Said lugs 38 are cut in the ends 92 of the flanges 46 of the profile approximately beyond the straight cuts 90 of the webs 48, said lugs 38 preferably assuming a rounded shape.

It is found that this second embodiment is also advantageous because it makes it possible to obtain a connecting part 30, such as a connecting rod, whose body 32 and yokes 34 are manufactured simultaneously from the same composite material, while the protective shell 74 can be obtained from materials and according to very low cost methods given that said shell 74 has mainly as its function the protection of the connecting part against impacts.

Said shell 74 can nevertheless bring an increase of deflection inertia that also augments the resistance of the connecting rod to compression buckling.

Of course, the invention also covers different variants that can be imagined from this second preferred embodiment.

Figures 15, 16:
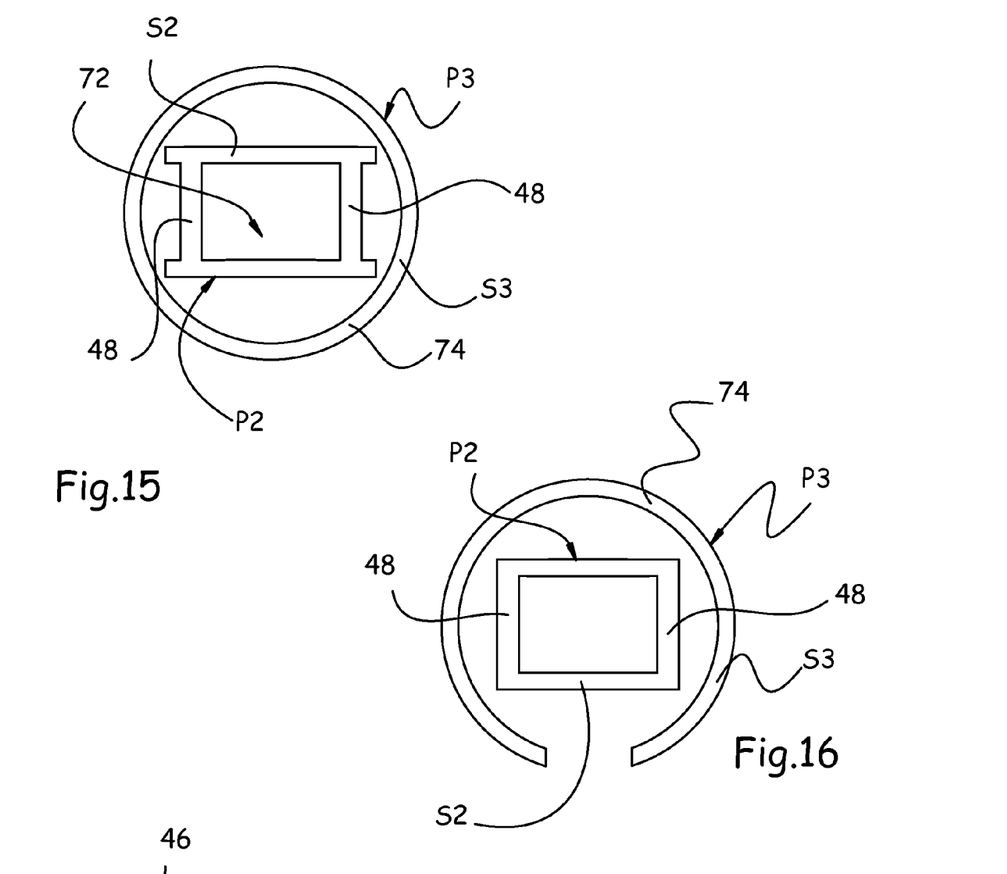
FIG. 15 shows a first variant of a cross-section of a first and second profile of a connecting part in a second preferred embodiment according to the invention.
FIG. 16 shows a second variant of a cross-section of a first and second profile of a connecting part in a second preferred embodiment according to the invention.

By way of example, FIG. 15 illustrates a first variant of the cross-sections (S1, S2) of the first and second profiles (P2, P3) in which the webs 48 are displaced toward the central part 72 of the first profile P2.

Also, and as illustrated in FIG. 16, the invention also covers a second variant of the cross-sections (S2, S3) of the first and second profiles (P2, P3) in which the outer shell 74 is not continuous.

Figure 17:
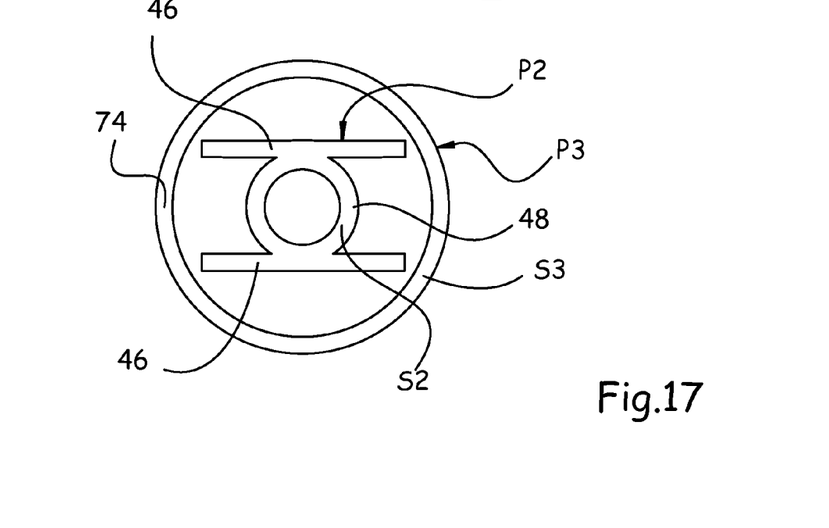
FIG. 17 shows a third variant of a cross-section of a first and second profile of a connecting part in a second preferred embodiment according to the invention.

Finally, the invention also covers a third variant of the cross-sections (S2, S3) of the first and second profiles (P2, P3), illustrated in FIG. 17, in which the first profile P2 comprises a hollow and approximately cylindrical central web 48 between the two flanges 46 of the first profile.

In the first and in the second preferred embodiments, the method according to the invention can foresee adding reinforcing pieces 94 at the level of the lugs 38 of the yokes 34, these reinforcing pieces making it possible to increase the resistance of the yokes to the battering pressures as well as to adjust easily the thickness of the lugs 38 as a function of the dimensions of the receiving means of the assembly to which the connecting part 30 is intended.

Preferably, said reinforcing pieces 94 are metallic, assume the shape of the lugs 38, are attached to the first profile P2 by gluing, and they can be bored simultaneously with the making of the bores 40 in the lugs 38 of the yokes of the connecting part.

In a preferred embodiment, the method according to the invention foresees placing reinforcing pieces 94 on both sides of each lug 38 of the yokes 34, as illustrated in FIG. 7.

So as to increase even more the mechanical characteristics of the connecting part, the method according to the invention can also foresee a filling of the hollow body of the connecting part, the different profiles (P, P1, P2, P3) being able to be filled with an alveolar material, preferably having closed cells, said filling being obtained by injection of a foam or any other material of slight density.

Of course, the invention also covers any connecting part, such as a connecting rod, produced according to the method according to the invention, as well as all of the uses of a connecting part produced according to the invention, such as, for example, its use in a portion of an aircraft that is not part of its structure or in structures other than that of an aircraft.

The invention claimed is:

1. Method for producing a connecting part (30), particularly a connecting rod of an aircraft, made of composite material, said connecting part comprising at least one hollow body (32) and at least one yoke (34) at each of the ends (36) of said body (32), characterized in that said body (32) and said yokes (34) of the connecting part (30) are derived from a single profile (P, P1, P2) of composite material obtained by pultrusion.

2. Method for producing a connecting part (30), particularly a connecting rod of an aircraft, of composite material according to claim 1, wherein the profile (P, P1, P2) comprises at least two flanges (46) connected by at least one solid web (48).

3. Method for producing a connecting part (30), particularly a connecting rod of an aircraft, of composite material according to claim 2, wherein the profile (P1) comprises a protective outer shell (52).

4. Method for producing a connecting part (30), particularly a connecting rod of an aircraft, of composite material according to claim 3, wherein the outer shell (52) assumes the shape of a membrane (54) that surrounds the flanges (46) of the profile (P1) and continues on the outer periphery of the cross-section (S1) of the profile (P1).

5. Method for producing a connecting part (30), particularly a connecting rod of an aircraft, of composite material according to claim 4, wherein said outer shell (52) is cylindrical over the length (L1) of said profile (P1).

6. Method for producing a connecting part (30), particularly a connecting rod of an aircraft, of composite material according to claim 3, wherein the profile (P1) comprises at least two solid webs (48) connecting at least two flanges (46), and wherein at least two solid webs (48) connecting the flanges (46) are an integral part of the protective outer shell (52).

7. Method for producing a connecting part (30), particularly a connecting rod of an aircraft, of composite material according to claim 3, wherein the flanges (46) are flat.

8. Method for producing a connecting part (30), particularly a connecting rod of an aircraft, of composite material according to claim 3, wherein it consists in at least:
selecting a portion (58) of predetermined length (L1) from the profile (P1) of composite material,
performing the cutting of the yokes (34) at each end (60) of said portion,
making the bores (40) through said cut yokes.

9. Method for producing a connecting part (30), particularly a connecting rod of an aircraft, of composite material according to claim 8, wherein the cutting operations consist in making tapered cuts (62) at the ends (60) of the length (L1) of selected profile (P1) and on both sides of the flanges (46) of said profile (P1), in stopping the solid web or webs (48) of the profile (P1) by straight cuts (64) at right angles with the tapered cuts (62), and in giving their final shape to the lugs (38) of the yokes (40) of the connecting part (30).

10. Method for producing a connecting part (30), particularly a connecting rod of an aircraft, of composite material according to claim 2, wherein the first profile (P2) comprises at least two solid webs (48) connecting the flanges (46).

11. Method for producing a connecting part (30), particularly a connecting rod of an aircraft, of composite material according to claim 10, wherein the two flanges (46) are flat and parallel.

12. Method for producing a connecting part (30), particularly a connecting rod of an aircraft, of composite material according to claim 10, wherein the first profile (P2) receives an outer shell (74) for protection against impacts, and wherein said outer shell (74) assumes the shape of a second profile (P3).

13. Method for producing a connecting part (30), particularly a connecting rod of an aircraft, of composite material according to claim 12, wherein said outer shell (74), or the second profile (P3), assumes the shape of a membrane (76) surrounding the flanges (46) and the web or webs (48) of the first profile (P2) and continues on the outer periphery of the cross-section (S2) of the first profile (P2).

14. Method for producing a connecting part (30), particularly a connecting rod of an aircraft, of composite material according to claim 13, wherein said outer shell (74), or the second profile (P3), is cylindrical over the length (L2) of said first profile (P2).

15. Method for producing a connecting part (30), particularly a connecting rod of an aircraft, of composite material according to claim 12, wherein attaching means (78) are provided between said first profile (P2) and said second profile (P3).

16. Method for producing a connecting part (30), particularly a connecting rod of an aircraft, of composite material according to claim 15, wherein the attaching means (78) consist in at least one collar (80) provided around the first profile (P2) and of a shape corresponding to the inside contour (82) of the second profile (P3), and/or in at least one stop (84) attached to said first profile (P2) and that stops the second profile (P3) in translation.

17. Method for producing a connecting part (30), particularly a connecting rod of an aircraft, of composite material according to claim 15, wherein the attaching means (78) consist in a dimensional adjustment of the profiles (P2) and (P3) so that they are in sliding contact, and then in a very localized gluing so as to bond them in position relative to one another.

18. Method for producing a connecting part, particularly a connecting rod of an aircraft, of composite material according to claim 12, wherein it consists in at least:
selecting a portion (86) of predetermined length (L2) from the first profile (P2) of composite material,
performing the cutting of the yokes (34) at each end (88) of said portion,
preparing the second profile (P3) at an appropriate length (L3),
attaching said second profile (P3) around the first profile (P2), particularly using attaching means (78),
making the bores (40) through said cut yokes (34).

19. Method for producing a connecting part, particularly a connecting rod of an aircraft, of composite material according to claim 18, wherein the cutting operations of the first profile (P2) consist in stopping the solid webs (48) of the first profile (P2) by straight cuts (90) recessed from the ends (92) of the flanges (46) of said first profile, and in giving their final shape to the lugs (38) of the yokes (34).

20. Method for producing a connecting part (30), particularly a connecting rod of an aircraft, made of composite material, said connecting part comprising at least one hollow body (32) and at least one yoke (34) at each of the ends (36) of said body (32), characterized in that said body (32) and said yokes (34) of the connecting part (30) are derived from a single profile (P, P1, P2) of composite material obtained by a continuous manufacturing process, wherein it foresees adding reinforcing pieces (94) at the level of said yokes.

21. Method for producing a connecting part (30), particularly a connecting rod of an aircraft, of composite material according to claim 1, wherein, the profile comprises at least two flanges (46) connected by at least one solid web (48), and in cross-section, an outermost edge of each flange (46) is attached to an inside edge of said at least one solid web (48).

* * * * *